Jan. 10, 1961  F. A. TRACK  2,967,717
FLUID SUSPENSION FOR WHEELED VEHICLES
Filed July 20, 1956  2 Sheets-Sheet 1

INVENTOR.
FRANK A. TRACK
BY
Attorney

Jan. 10, 1961  F. A. TRACK  2,967,717
FLUID SUSPENSION FOR WHEELED VEHICLES
Filed July 20, 1956  2 Sheets-Sheet 2

INVENTOR.
FRANK A. TRACK
BY
Cornelius Zabriskie
Attorney

United States Patent Office 2,967,717
Patented Jan. 10, 1961

2,967,717
FLUID SUSPENSION FOR WHEELED VEHICLES
Frank A. Track, 29 St. George Ave., Stamford, Conn.
Filed July 20, 1956, Ser. No. 599,037
9 Claims. (Cl. 280—124)

This invention is a fluid suspension for wheeled vehicles and the primary objectives are:

(1) To provide a fluid cushion between the body and running gear in lieu of conventional springs.

(2) To provide a free springy relative movement between the body and running gear.

(3) To provide means whereby the body can rotate with respect to the running gear transversely when the body is subjected to an external force.

(4) To provide means whereby the body when so displaced will return to its original position relative to the running gear when the displacing external force is removed.

(5) To provide means whereby if the vehicle is at rest or proceeding in a direct line on a transversely inclined road, the body will tend to assume a nearly vertical position with respect to the horizon.

(6) To provide means whereby the running gear moves vertically relative to the body on receiving road impulses at all angles of inclination of the running gear.

(7) To provide means whereby, whenever the body is transversely rotatively displaced, a righting lever is created with a tendency for the body to assume a position normal to the axle of the running gear.

(8) To provide means whereby the body will tend to assume an inward tilt when rounding a curve—the angle of tilt depending on the centrifugal force applied.

(9) To provide limiting stops against undue transverse relative rotary movement between the body and running gear.

The foregoing objects are obtained by the employment of the following features:

(a) The loaded body is sprung, floated and supported on a fluid containing buoyancy chamber interposed between the body and running gear. The fluid is pressurized, and may be either a gas or a liquid. The preferred gas is air and the preferred liquid is water treated with anti-freeze.

(b) The buoyancy chamber has transversely curvilinear plates forming upper and lower walls, the upper plate being a part of the body, and the lower plate being a part of the running gear, the space between plates being under pressure of a fluid, and the space being enclosed at its periphery by strong fluid-tight seals in the form of flexible walls capable of flexing and rolling and unrolling on the contact surfaces of the upper and lower plates.

(c) A transverse rotational center, created by virtue of the curved upper plate of the supporting cushion floating on the pressurized fluid.

(d) Flexible fluid-tight seals between the two curvilinear plates of the cushion and attached to these plates at the upper and lower marginal edges of the seal so that each seal has a free face of contact with said plates and the midpoint is free to assume a semi-circular shape between the two curvilinear plates. The body is free to move transversely about the created center of oscillation by the unrolling of a portion of the contacting surface of the seal from the upper plate and the rolling of an equal amount of seal surface into engagement with the lower plate at one side of the body, with converse operation at the opposite side of the body. The amount of transverse rotation is limited by the permissible unrolling operations of the seal, the seal at the lateral edges providing stops for rotational movement when said seal at both lateral edges is completely unrolled.

(e) The seals permit a spring-like action, when caused by inequalities in the road, by the contraction and expansion of the semi-circular end sections.

(f) Proper vertical resiliency in the connection between the running gear and body is assured through the use of a surge chamber connected to the buoyancy chamber. The lower portion of this surge chamber contains liquid, while the upper portion contains a gas under pressure. The amount of gas in this chamber may be varied to control the degree of resiliency desired by addition or subtraction of the contained liquid and the buoyancy fluid in the buoyancy chamber is free to surge back and forth between said chamber and the surge chamber to provide the resilient connection to which I have referred.

(g) The rolling and unrolling of the seals upon the two curvilinear surfaces always maintains a constant buoyant area upon the upper curvilinear plate. A movement of either side subtracts a buoyant area on one side and adds an equal area on the opposite side.

(h) The center of gravity of the body has an angle of arcuate movement twice that of the buoyant area and creates a righting lever at the instant of rotation of the body and ever increasing as the rotation becomes greater.

Features of the invention, other than those adverted to, will be apparent from the hereinafter detailed description and appended claims, when read in conjunction with the accompanying drawings.

The accompanying drawings illustrate diagrammatically the embodiment of the invention, but the construction therein shown is to be understood as illustrative, only, and not as defining the limits of the invention.

Figure 7:
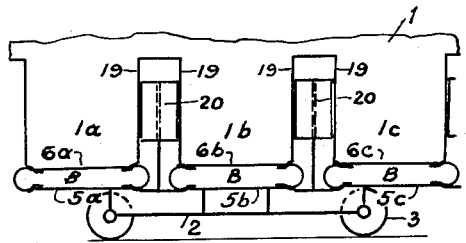

Fig. 7 is a diagrammatic section taken longitudinally of the vehicle and illustrating the employment of a plurality of buoyancy chambers arranged in tandem longitudinally of the vehicle with means for fixing the body against longitudinal movement relative to the undercarriage while permitting relative vertical and transverse movement between them. In this figure, the several buoyancy chambers are mounted upon a common undercarriage.

Figure 8:
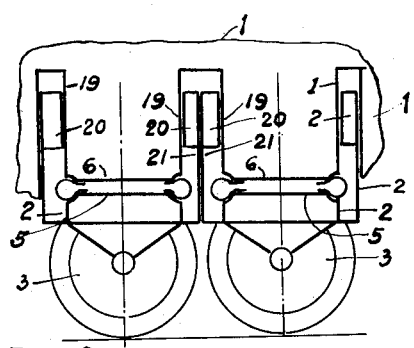

Fig. 8 is a view similar to Fig. 7, but shows the several buoyancy chambers supported on separately sprung individual undercarriages.

Figure 9:
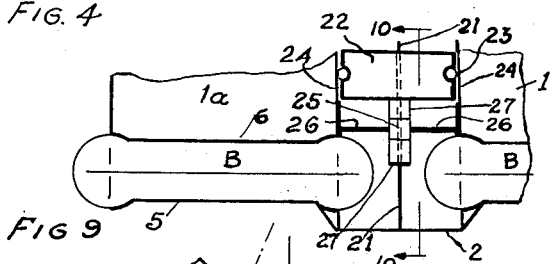

Fig. 9 is a longitudinal section taken through multiple buoyancy chambers arranged in tandem longitudinally of the vehicle and illustrating a modified means for precluding relative longitudinal movement between the body and its undercarriage while permitting limited transverse rotary movement and limited vertical movement between the body and the undercarriage.

Figure 10:
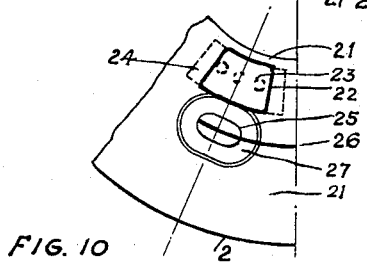

Fig. 10 is a section on the line 10—10 of Fig. 9.

Figure 11:
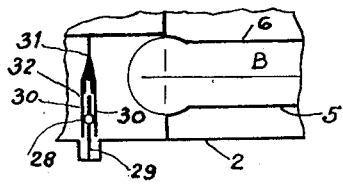

Fig. 11 is a fragmental section similar to Fig. 9, but showing a modified form of construction.

Figure 12:
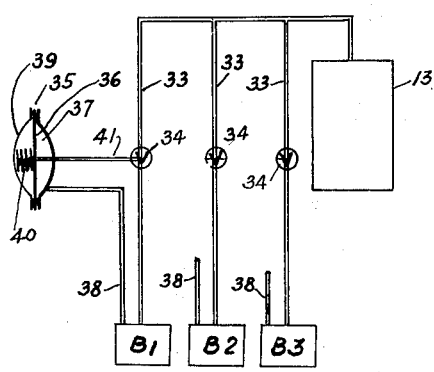

Fig. 12 is a diagrammatic showing of means whereby a vehicle equipped with a suspension embodying a plurality of buoyancy chambers associated with one undercarriage may continue to properly support the body in the event that one or more and less than all of said chambers become inoperative.

This invention may be employed wherever a load carrying body is to be supported in a manner to protect it against undesirable shock or vibration. It may be utilized in trucks, trailers or other vehicles of either single or tandem axle types. However, for the purpose of concrete disclosure, I have shown the invention in the accompanying drawings as associated, in the main, with a railroad car.

Figure 1:
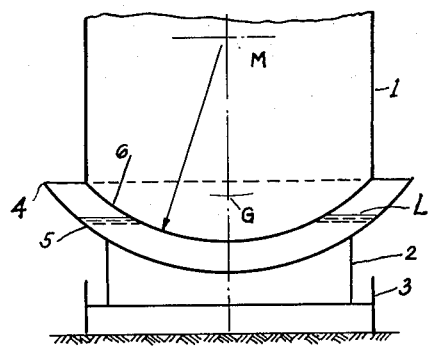
Fig. 1 is a body with a circular arced bottom floating upon a trough shaped underbody containing a liquid.
Figure 2:
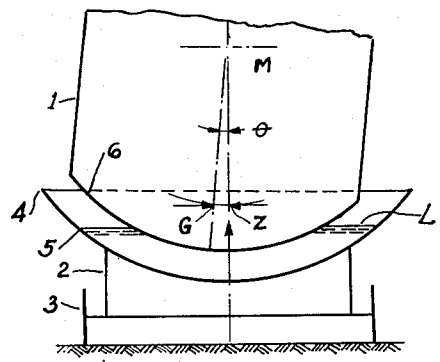
Fig. 2 is the same body displaced through an angle and indicating one of the basic phenomena in physics, viz.: that a body so displaced has an unbalanced status and tends to right itself to its original status when the displacing force is removed.

Figs. 1 and 2 show a body 1 with an immersed cylindrically shaped section supported by a liquid L. It is fundamental in physics that the center of rotation of the cylindrical floating body is at the center of the generating circle, and that the body is stable if the center of gravity G of the floating body is lower than the center M of the generating circle. Any displacement of the body 1 creates a righting lever which tends to restore the body to its original status of vertical to the horizon or plane of the sustaining liquid.

I utilize the principles illustrated in Figs. 1 and 2 in carrying out the present invention as shown in the remaining figures of the drawings in which the inherent parts of a railway car are shown. In these remaining figures, 1 designates the body of the car, 2 the undercarriage provided with an axle and wheels 3. In this showing the undercarriage supports a trough 4 provided with a curvilinear surface 5 which may be curved on the arc of a circle or otherwise. The body 1 has a lower curvilinear surface 6 and is adapted to be supported by a fluid contained in the trough 4.

Figure 5:
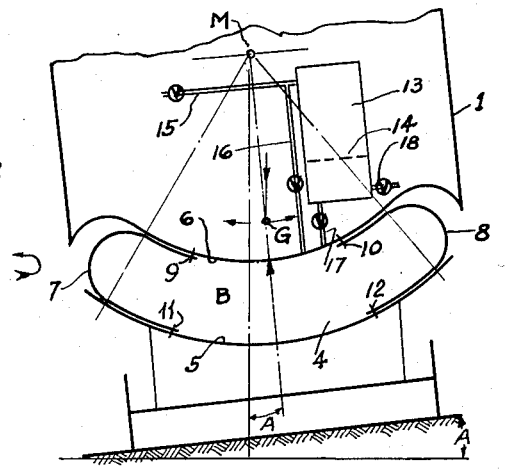
Fig. 5 is a diagrammatic view showing the position assumed by the parts as the vehicle is rounding a banked curve at moderate speed and under the action of moderate centrifugal force. This view also shows a cushioning chamber associated with the body.
Figure 6:
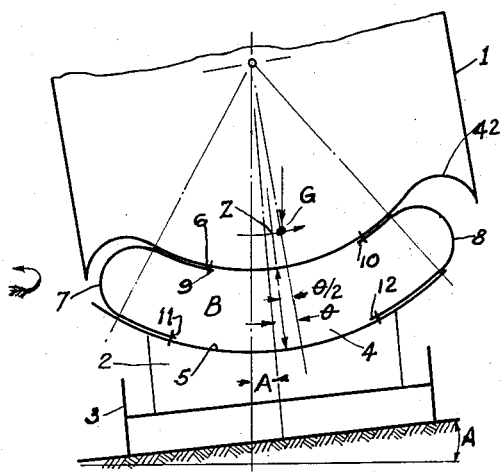
Fig. 6 is a view similar to Fig. 5, but showing the relation of the parts under the action of a greater centrifugal force at a greater accelerated speed on a banked curve.

It will be apparent from Figs. 1 and 2, however, that in order to properly function in a railroad car, the body 1, which constitutes the floating body, will not necessarily remain centered in the containing trough unless some means is definitely provided to center it. In the invention as shown in Figs. 3–6, inclusive, this means comprises side walls 7 and 8 which are identical at both sides of a vehicle. These side walls are preferably formed of fabric, rubberized or otherwise, treated to render the same impervious to the fluid contained in the trough. The upper margins of the fabric walls are secured to the bottom surface of the body at 9 and 10, while the lower margins are secured to the bottom wall of the trough at 11 and 12. By thus marginally securing the fabric to the body and trough, the major portion of these fabric walls is free to flex vertically to permit relative vertical movement between the body and the undercarriage At the same time the body is free to rotate relative to the undercarriage during which operation the intermediate portions of the fabric walls can roll over the corresponding surfaces of the respective parts, as shown in Figs. 4–6 inclusive. It will of course be understood that the side walls 7 and 8 extend along the lateral sides of the trough and body as well as along the transverse edges thereof.

There is thus formed a closed chamber B which I term a buoyancy chamber. It has an upper rigid curvilinear wall 6, a lower curvilinear rigid wall 5 and flexible peripheral walls 7 and 8 along its lateral sides and with corresponding walls along its forward and rear transverse edges. Ths chamber is adapted to contain a fluid which may be either a liquid or a gas, but in any event, the pressure in such fluid is such as to properly support the body and its load above the undercarriage 2.

In order that the buoyancy chamber may function in a resilient manner to take up road shocks and provide for smoother riding of the body, there is associated with the buoyancy chamber, a surge chamber 13, Fig. 5. This surge chamber may be placed in any convenient location and the fundamental characteristic of this chamber is that its lower portion is adapted to contain a liquid, the upper level of which is indicated at 14 in Fig. 5. The upper portion of the chamber above the liquid contains at all times a gas under pressure.

The surge chamber preferably has a plurality of piping connections. One pipe 15 leads from a source of gas pressure, such, for example, as a compressed air tank on a vehicle. A second pipe 16 leads from the buoyancy chamber to the upper portion of the surge chamber 13. Another pipe 17 leads from the bottom of the surge chamber to the buoyancy chamber, while another pipe 18 constitutes means for introducing water into or withdrawing it from the chamber. Each of the pipes referred to contain valves whereby fluid may be permitted or precluded from passing pressure.

When the buoyancy medium contained within the buoyancy chamber B is a liquid, the valve in the pipe 17 is opened and the valves in all of the remaining pipes are normally closed, so that gaseous pressure within the surge chamber above the liquid level 14 is trapped. Consequently, as the undercarriage receives shocks from the roadbed, a part of the liquid in the undercarriage surges back and forth through the pipe 17 into and out of the surge chamber and the flow of such liquid into the chamber is cushioned by the gaseous pressure contained therein, so as to produce resilient reaction against such flow and the resulting cushioning of the body against the transmission of shocks from the undercarriage.

When the buoyancy medium in the buoyancy chamber B is gaseous, the valve in the pipe 16 is open while the valves in all the remaining pipes remain closed, so that gaseous pressure will surge through the pipe 16 into and out of the confined gaseous chamber within the surge tank, which will cushion the shocks transmitted from the road bed and promote easy riding qualities in the body.

In either event, the liquid level 14 may be varied as desired by admitting or drawing off liquid from the surge chamber through the pipe 18, to change the volumetric gaseous capacity of the surge chamber and thus control the degree of resiliency. It will of course be understood that the valve in the pipe 15 may be opened from time to time to either increase the gaseous pressure in the surge chamber or to release some of such pressure as may be desired.

In addition to the resiliency functions of the surge chamber in carrying out the present invention, I may, if desired, utilize this chamber to carry out additional functions respecting varying loadings of the body as described in my copending application, Serial No. 584,974, filed May 15, 1956, now Patent No. 2,859,711 on "Fluid Suspension for a Load Carrying Body," of which this application is a continuation-in-part.

In the description as thus far advanced, it has been assumed that a single undercarriage supports a single buoyancy chamber on which one end of the body of the car is supported. In carrying out this invention, however, that end of the car or other vehicle may be supported upon a plurality of buoyancy chambers arranged in tandem longitudinally of the body. Such a construction is shown in Fig. 7 wherein the body 1 of the car is provided with three depending body portions 1a, 1b and 1c, spaced apart longitudinally of the car and each of which has a longitudinal section, such as shown in Figs. 3–6, inclusive. The lower surfaces of these portions are designated 6a, 6b and 6c. Beneath each of these body portions is a buoyancy chamber B with all of said chambers supported on a common undercarriage 2, different portions 5a, 5b and 5c of which are the troughs of the individual buoyancy chambers, although in practice the trough may be continuous for all of said chambers.

The several body portions 1a, 1b and 1c are spaced from one another to provide transverse spaces 19 and the undercarriage is provided with a relatively rigid upstanding thrust retaining wall 20 extending into each of said spaces and having relatively close fit therein in a direction longitudinally of the vehicle for the purpose of taking up braking and draft strains, so that the flexible walls of the buoyancy chambers are not subjected thereto.

In Fig. 8, I have shown a multiple arrangement of buoyancy chambers with each of such chambers supported upon its own individual wheeled axle. In a multiple axle vehicle of this kind, the wheel and axle of one system is separately sprung from that of the second wheeled axle and each wheeled axle has its individual buoyancy chamber or chambers.

In Fig. 7 the draft and braking strains are taken up by retaining walls interposed between successive body portions of the body 1. In Figs. 9 and 10, which are views taken longitudinally of the vehicle, the undercarriage 2 serves as a support for the buoyancy chambers B on which is superimposed body portions 1a and 1b. Rigid with the undercarriage is an upstanding wall 21 which extends transversely of the vehicle and superimposed on this wall is a retaining member 22 carrying anti-friction bearings 23 in its side walls. These bearinsg operate within depressions 24 formed in the adjacent faces of the body portions 1a and 1b shown best in Fig. 10. These depressions serve to limit the relative vertical movement between the body and the undercarriage and also the transverse rotary movement of the body. The body portions 1a and 1b also carry a cross head 25 connected at 26 to the adjacent body portions 1a and 1b and this cross head operates within a guide opening 27 formed in the wall 21. The member 22 and anti-friction bearings 23 remove longitudinal draft and braking strains from the buoyancy chambers and at the same time limit the rotary and vertical movement of the body with respect to the undercarriage. The cross head 25 operating within the guide opening 27 supplements these latter functions.

In the modified construction of Fig. 11, the braking and draft strains are taken up by anti-friction bearings 28 carried by a wall 29 rigid with the undercarriage 2 and interposed between flanges 30 of a forked member 31 rigid with the body. The inner faces of the flanges 30, which engage the anti-friction bearings 28, are provided with recesses 32 which permit of vertical and rotary movement of the body within predescribed limits. This structure of Fig. 11 may be used in lieu of the structures of Figs. 9 and 10 or the structures of Figs. 7 and 8.

In a suspension embodying multiple or buoyancy chambers there is always the possibility that through leakage, damage or otherwise, one or more of these chambers may become inoperative and it is therefore desirable to automatically cut out such chamber or chambers in such an event while maintaining proper support of the body on the remaining chamber or chambers.

Fig. 12 shows a system whereby this may be accomplished. In this figure, several buoyancy chambers designated B1, B2 and B3 are presumed to constitute the buoyancy means for this particular suspension. Each of these individual buoyancy chambers has a piping connection 33 to a surge chamber 13 of the character hereinbefore described and in each of these piping connections is a valve 34. Each valve is controlled by a differential pressure mechanism indicated generally by the reference character 35 which is duplicated for each valve 34. Any appropriate conventional differential pressure device may be used for this purpose, but the one herein shown for illustration comprises a diaphragm 36 provided at one side with a chamber 37 having a piping connection 38 to its corresponding buoyancy chamber. At the opposite side of the diaphragm is a retaining hood 39 in which is positioned a spring 40 bearing against the diaphragm. The one side of the diaphragm is connected to the stem 41 of the corresponding valve 34 and the spring and pressure within the related buoyancy chamber B are so adjusted that, so long as the pressure in said buoyancy chamber remains effective to support the load, the valve 34 will be open. However, should there be a pronounced pressure drop within said buoyancy chamber, the spring 40 will immediately close the valve 33 and thereby cut out this buoyancy chamber from the system, so that the remaining buoyancy chambers may continue to carry the load.

It will of course be understood that under these conditions it will be desirable to either manually or automatically add additional air to the surge chamber through pipe 15 to restore the spacing between the car body and the undercarriage, but the operations in this connection will be clearly understood from the foregoing description.

Having described the individual elements forming part of the present invention, I will next describe the manner in which said parts collectively function in a railway car in service.

Figure 3:
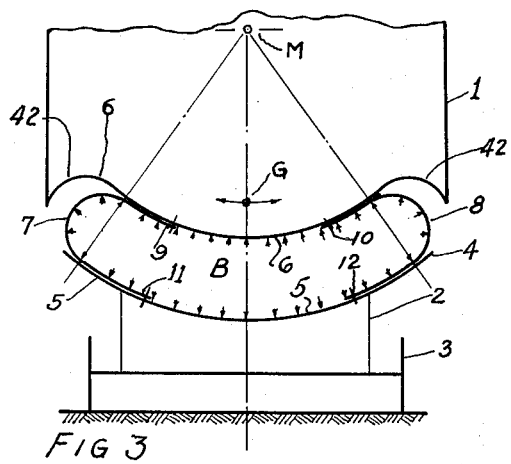
Fig. 3 is a diagrammatic view of the body floating on a fluid in an enclosure, the upper and lower walls of which are curvilinear and of a non-yielding material, and the edge walls of which are of a flexible strong fabric, rendered fluid tight and rollably attached to the upper and lower walls.
Figure 4:
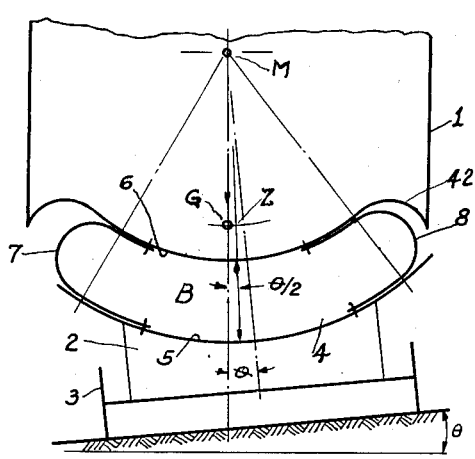
Fig. 4 is a diagrammatic view of Fig. 3 with the body displaced through an angle relative to the trough which is shown as part of an undercarriage provided with running gear shown as traversing a straight banked track.

When the car is at rest on a level track or moving along such track, as the case may be, the relative relation of the parts is as shown in Fig. 3. Here the center of gravity or weight of the body 1 is indicated at G and at a point appreciably below the metacenter or center of curvature M of the surface 6 which constitutes the upper wall of the buoyancy chamber B. The relation of the parts remains as shown in these figures, so long as the said conditions of rest or rectilinear motion obtain.

Suppose now that the car is at rest or rectilinearly moving along a roadbed which is tilted, as shown in Fig. 4. As the car moves from the horizontal roadbed of Fig. 3 to the tilting roadbed of Fig. 4, the trough 4 of the undercarriage will tilt as shown in the latter figure, but the center of gravity G of the body tends to and will assume vertical alinement with the metacenter M, so that the body of the car will tend to remain vertical. During the transition stage, the flexible wall 7 will unroll from the surface 6 of the body and corresponding roll into contact with the surface 5 of the trough 4, while the flexible wall 8 will do just the opposite. By this operation, the supporting buoyant area of the upper surface of the buoyancy chamber, as shown in Fig. 3, will remain constant during such transition, so that the buoyancy area in Fig. 4 is the same as in Fig. 3.

It is evident that in the operation described, the upper effective surface of the buoyancy chamber remains constant irrespective of the relative rotary movement between the body and the undercarriage, but the center of buoyant support is moved through an angle $$\frac{\theta}{2}$$

in an angular bodily movement of $\theta$. Thus for a body movement of an angle $\theta$, an angle of restoration of $$\frac{\theta}{2}$$

is created and a couple is formed with GZ as a lever arm. The greater the angularity of the body with respect to the running gear, the greater the leverage arm becomes and therefore the moment to restore the body in equilibrium with respect to the running gear is increased correspondingly.

If it now be assumed that the car enters a banked curve in the track at a moderate speed, the conditions which will result appear as shown in Fig. 5. The relatively light centrifugal force tends to move the position of the body from that shown in Fig. 4 to that shown in Fig. 5, bearing in mind always that the effective area of the upper surface of the buoyancy chamber continues to remain unchanged.

Under these conditions the body will tend to assume the approximate position wherein this medial longitudinal plane is normal to the axle of the undercarriage. However, as the train increases speed on the curve, the additional centrifugal force asserts itself and moves the center of gravity G of the body outwardly of the curve, as shown in Fig. 6, the effective buoyancy area remaining constant as before, but the flexible side walls unroll and roll to a greater extent that in the previous showings. Thus the body is tilted inwardly to a greater extent than before which is of course contrary to conventional railway operation, but affords a more comfortable relation between seat and passenger than in the conventional construction. When the invention is incorporated in freight cars, the tilting of the car under the conditions stated, tends to more efficiently carry the load without tendency of the load to shift with consequent breakage.

If the car is equipped with the limiting devices shown in Figs. 7–11 inclusive, said limiting devices will control maximum rotary movement between the body and the undercarriage. However, if these devices are not present in the construction of Figs. 3–6, the limiting of this relative movement can be accomplished by forming on the body of the car curvilinear stops or abutments 42 which serve to arrest this relative movement at predetermined termini positions.

Reference has hereinbefore been made to the righting leverage which tends to maintain the body 1 in predetermined positions with respect to the undercarriage under various conditions of operation. It should be noted in this connection that the lateral flexible walls 7 and 8 also have a definite restorative function. The smaller radius of the flexible wall on that side wherein the load has been shifted has a less surface tension within the fabric proper while the larger radius of the flexible walls on the opposite side has a greater surface tension within the fabric proper. The tendency therefore is for the radii to assume equality and maintain surfaces 5 and 6 concentric with an even equal distance of separation.

As shown in Fig. 4, the center of gravity G of the body becomes relatively displaced through an angle $\theta$ from that of the plane normal to the running gear and thereby produces a righting leverage. However, in this displacement the weight is concentrated more on the left hand side of the figure than on the right, thereby contracting the radius of the flexible wall 7 and increasing the radius of the flexible wall 8. This creates a condition where the center of buoyant effort has a tendency to decrease the angle $$\frac{\theta}{2}$$

and move G slightly to the right relative to the running gear. The radius of the flexible wall 7 being then smaller will have less tangential pull on both body and running gear than the flexible wall 8, all of which combined, tend to relatively move the center of gravity directly above the center of buoyant effort and simultaneously the constant buoyancy area moves to the left and is positioned beneath G, thereby producing a stable effect. It therefore follows that the body in Fig. 4 will not be directly vertical to the horizon, but tilted slightly to the left.

In the construction of Figs. 5 and 6, the same factors which attend he operations of the flexible walls 7 and 8 of Fig. 4 will function to reestablish the relation of stability of the body with respect to the running gear and will bring about a re-establishment of the relation of the parts shown in Fig. 3, when the car comes to a straight, level track and is at rest or rectilinear motion thereon.

In the foregoing description I have not attempted to show structural details, such as car, truck and body construction, fifth wheel and king pin expedients, body design, or similar details, but have dealt with these matters in their broad aspect, for the present invention is not limited to details of vehicle design which can readily be supplied by those skilled in the art. The drawings and description are, however, in such full, clear, concise and exact terms as to enable any person skilled in the art to which it pertains to make and use the invention.

The foregoing detailed description sets forth the invention in its preferred practical forms, but the invention is to be understood as fully commensurate with the appended claims.

This application is a continuation-in-part of my application Serial No. 584,974, filed May 15, 1956, on "Fluid Suspension for a Load Carrying Body."

Having thus fully described the invention, what I claim as new and desire to secure by Letters Patent is:

1. A fluid suspension for a vehicle comprising: a supporting base having a transversely curvilinear upper surface, a load carrying body above the base, said load carrying body having a transversely curvilinear bottom surface, side walls connecting the base to the load carrying body to form within the confines of said walls above the base and below the load carrying body a buoyancy chamber, and means for supplying and discharging fluid under pressure to and from the buoyancy chamber, said side walls being flexible and adapted for rolling tangential coaction with curvilinear surfaces of the supporting base and the load carrying body to permit rotary lateral movement between the load carrying body and the supporting base and to also permit relative vertical movement between the load carrying body and the supporting base, whereby said rolling and unrolling coaction of the flexible walls provide a corrective righting moment at all times between the load carrying body and the supporting base, the curvilinear bottom surface of the load carrying body serving to establish the metacentric point of rotation of the load carrying body, and means interposed between the load carrying body and the supporting base to permit a definite amount of both vertical and curvilinear transverse movement within predetermined limits by the load carrying body relative to the supporting base.

2. A fluid suspension according to claim 1, wherein the buoyancy chamber contains gas under pressure.

3. A fluid suspension according to claim 1, wherein the buoyancy chamber contains liquid under pressure.

4. A fluid suspension according to claim 1, comprising means interposed between the body and the supporting base to preclude relative longitudinal movement between them.

5. A fluid suspension according to claim 1, wherein the bottom surface of the load carrying body is of arcuate cross section with its axis of curvature above the center of gravity of the load carrying body.

6. A fluid suspension according to claim 5, wherein the upper surface of the base is also arcuate and coaxial with the bottom surface of the load carrying body.

7. A fluid suspension according to claim 6, wherein the guiding means is also coaxial with the curvature of the bottom surface of the load carrying body.

8. A fluid suspension for vehicles comprising: a supporting base, a load carrying body above the base, a pressurized fluid containing buoyancy chamber interposed between the base and the body and supporting the body on the chamber, said chamber having a transversely curvilinear upper surface and a lower surface, a peripherally flexible fluid-tight seal at the edges of said chamber, and said body being rotatable transversely about the center of buoyant effort of the fluid upon the upper surface of the buoyancy chamber, said flexible fluid-tight seal comprising peripheral walls the upper and lower margins of which are secured respectively to the upper and lower surfaces of the chamber with the portions of said walls adjacent said margins loosely engaging said upper and lower surfaces and the intermediate portion of the flexible walls bulging in an outward direction tangentially to said surfaces to permit of relative movement of the body with concurrent rolling and unrolling engagement of the flexible walls onto and from said surfaces exterior of the buoyancy chamber.

9. A fluid suspension according to claim 8, comprising means for limiting relative transverse rotational movement between the base and the body.

References Cited in the file of this patent

UNITED STATES PATENTS

| | | |
|---|---|---|
| 720,966 | Pulbrook | Feb. 17, 1903 |
| 1,461,042 | McWhorter | July 10, 1923 |
| 1,488,646 | Nygaard | Apr. 1, 1924 |
| 2,116,027 | Kolbe | May 23, 1938 |
| 2,134,515 | Hoskyns | Oct. 25, 1938 |
| 2,488,288 | Gouirand | Nov. 15, 1949 |
| 2,591,641 | Troendle | Apr. 1, 1952 |
| 2,694,569 | Gouirand | Nov. 16, 1954 |

FOREIGN PATENTS

| | | |
|---|---|---|
| 328,480 | Great Britain | May 1, 1930 |